US008164708B2

(12) United States Patent
Kim et al.

(10) Patent No.: US 8,164,708 B2
(45) Date of Patent: Apr. 24, 2012

(54) LIGHT GUIDE PLATE, AND BACKLIGHT ASSEMBLY AND LIQUID CRYSTAL DISPLAY HAVING THE SAME

(75) Inventors: Heu-Gon Kim, Yongin-si (KR); In-Sun Hwang, Suwon-si (KR); Taek-Sun Shin, Cheonan-si (KR); Byung-Seo Yoon, Incheon (KR); Sung-Kyu Shim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 200 days.

(21) Appl. No.: 12/179,329

(22) Filed: Jul. 24, 2008

(65) Prior Publication Data

US 2009/0167987 A1 Jul. 2, 2009

(30) Foreign Application Priority Data

Dec. 31, 2007 (KR) .................. 10-2007-0141689

(51) Int. Cl.
G02B 6/00 (2006.01)
G02F 1/1335 (2006.01)
F21V 7/04 (2006.01)
(52) U.S. Cl. .................. 349/61; 385/147; 362/620
(58) Field of Classification Search .................. 385/146, 385/147; 362/26, 31, 310, 341, 146, 61, 362/620, 626; 349/61, 62, 63, 64, 65
See application file for complete search history.

(56) References Cited

U.S. PATENT DOCUMENTS

| | | | | |
|---|---|---|---|---|
| 5,999,685 A * | 12/1999 | Goto et al. | | 385/146 |
| 7,104,679 B2 * | 9/2006 | Shin et al. | | 362/626 |
| 7,478,942 B2 * | 1/2009 | Kim et al. | | 362/620 |
| 7,488,095 B2 * | 2/2009 | Shim et al. | | 362/362 |
| 7,522,809 B2 * | 4/2009 | Yamashita et al. | | 385/146 |
| 7,690,830 B2 * | 4/2010 | Koganezawa et al. | | 362/615 |
| 7,736,045 B2 * | 6/2010 | Yamashita et al. | | 362/615 |
| 2003/0090887 A1 * | 5/2003 | Igarashi et al. | | 362/31 |
| 2005/0094295 A1 * | 5/2005 | Yamashita et al. | | 359/833 |
| 2005/0280752 A1 * | 12/2005 | Kim et al. | | 349/62 |
| 2006/0268571 A1 * | 11/2006 | Harada et al. | | 362/607 |
| 2006/0291253 A1 * | 12/2006 | Kim et al. | | 362/620 |
| 2007/0047214 A1 * | 3/2007 | Nesterenko et al. | | 362/19 |
| 2008/0099668 A1 * | 5/2008 | Hwang et al. | | 250/227.31 |
| 2009/0147179 A1 * | 6/2009 | Yamashita et al. | | 349/64 |

* cited by examiner

*Primary Examiner* — Akm Ullah
(74) *Attorney, Agent, or Firm* — F. Chau & Associates, LLC

(57) ABSTRACT

A light guide plate for guiding light includes a light-incident portion allowing light generated from a light source to be incident thereon, a light-facing portion opposite to the light-incident portion, and a first prism pattern disposed between the light-incident portion and the light facing portion and substantially normal to a path of light incident from the light-incident portion to the light-facing portion path.

14 Claims, 8 Drawing Sheets

Comparative Example    Embodiment

LIGHT GUIDE PLATE, AND BACKLIGHT ASSEMBLY AND LIQUID CRYSTAL DISPLAY HAVING THE SAME

This application claims priority to Korean Patent application No. 10-2007-0141689, filed on Dec. 31, 2007, and all the benefits accruing therefrom under 35 U.S.C. 119, the contents of which are herein incorporated by reference in their entirety.

BACKGROUND OF THE INVENTION

1. Field of the Invention

The present invention relates to a light guide plate, and a backlight assembly and a liquid crystal display having the same, and more particularly, to a light guide plate including prism patterns normal to a path of incident light, and a backlight assembly and a liquid crystal display having the light guide plate.

2. Description of Related Art

Generally, a liquid crystal display (LCD) is a device for displaying an image using liquid crystal having optical and electrical characteristics, such as anisotropic refractive index and anisotropic dielectric constant. The LCD is typically thinner and lighter than other display devices such as a cathode ray tube (CRT) and a plasma display panel (PDP) while having a lower operation voltage and lower power consumption. Thus, the LCD has been widely used.

The LCD includes an LCD panel, which has a thin film transistor (TFT) substrate, a color filter substrate opposite to the TFT substrate, and a liquid crystal layer interposed between the TFT and color filter substrates. The liquid crystal layer is used to change light transmittance through the LCD panel. A backlight assembly is typically used together with the LCD panel to provide light to the LCD panel.

A backlight assembly typically includes a lamp for generating light, and a light guide plate (LGP) for guiding a path of light from the lamp disposed along a side surface of the backlight assembly, toward the LCD panel. Light guide plates may be classified as flat or wedge types. The flat type light guide plate includes a light-incident portion on which light is incident and a light-facing portion which is opposite the light-incident portion having the same thickness. The wedge type light guide plate tapers from a light-incident portion to a light-facing portion.

To prevent the light guide plate from being discolored and improve a brightness characteristic, a prism light guide plate in which a prism pattern is formed on a bottom surface thereof has been developed. In the case of the flat type light guide plate whose thickness is constant, the light guided into the light guide plate substantially satisfies a total reflection condition, so that only the prism pattern may cause the light to exit to the outside.

However, in case of the wedge type light guide plate, when light is guided into the light guide plate, the light does not satisfy the total reflection condition and exits laterally, thereby causing a light loss. The light loss increases from the light-incident portion to the light-facing portion.

Specifically, if point light sources are used, the light emitted from the respective point light sources and reflected by the prism pattern may appear as white spots or white lines depending on its recognition angle. As a result, such white spots or lines may deteriorate the visibility.

SUMMARY OF THE INVENTION

According to an embodiment of the present invention, there is provided a light guide plate, which includes a light-incident portion allowing light generated from a light source to be incident thereon a light-facing portion opposite to the light-incident portion and a first prism pattern disposed between the light-incident portion and the light-facing portion and substantially normal to a path of light incident from the light-incident portion to the light-facing portion path.

The first prism pattern may include portions having at least one of a trochoidal shape including a cycloidal or tautochrone shape, a cosine shape, a wavy line shape, an elliptical shape, a circular shape, an arched shape, a plane-geometrical quadratic function curved shape and a curved concave shape with respect to the light-incident portion in plan view. The first prism pattern may include portions having an elliptical or circular shape. The first prism pattern may include portions having a circular shape, and the light source may be positioned substantially at a center of the circular shape.

The first prism pattern may be formed substantially in parallel with the light-incident portion. The first prism pattern may be disposed substantially in parallel with the light-incident portion and include substantially parallel prisms, each prism comprising an iterated curve, and a curvature of the curves of the prisms may become smaller away from the light-incident portion.

The light guide plate may further include a light-exiting portion extending from an upper side of the light-incident portion and connected to an upper side of the light-facing portion, wherein the light-exiting portion may include a plurality of second prism patterns connected to each other. The second prism patterns may be disposed substantially normal to the light-incident portion.

The light guide plate may further include a reflective portion extending from a lower side of the light-incident portion and connected to a lower side of the light-facing portion, wherein the first prism pattern may be engraved on the reflective portion. The first prism pattern may be disposed substantially in parallel with the light-incident portion and include substantially parallel prisms, wherein an interval between the prisms may become denser as the first prism pattern goes away from the light-incident portion.

The light-facing portion may be thinner than the light-incident portion. The light guide plate may further include the first prism pattern disposed substantially in parallel with the light-incident portion and including substantially parallel prisms, a light-exiting portion extending from an upper side of the light-incident portion and connected to an upper side of the light-facing portion and a reflective portion extending from a lower side of the light-incident portion and connected to a lower side of the light-facing portion the reflective portion being substantially parallel to the light-exiting portion, wherein a gap between the reflective portion and the light-exiting portion may become smaller with the respective ones of the prisms as boundaries therebetween as the reflective portion goes from the light-incident portion to the light-facing portion.

According to an embodiment of the present invention, a backlight assembly includes a light source for generating light, and a light guide plate for guiding the light incident from the light source, wherein the light guide plate includes a first prism pattern disposed substantially normal to a path of light incident from the light source.

The light source may include one or more point light source. The first prism pattern may be formed in an iterated curve, and a period of the curve may be N or 1/N times of a distance between the point light sources, where N is a natural number.

The first prism pattern may be formed in an iterated curve, and an extreme point of the curve and the light source form a line substantially normal to a light-incident portion of the light guide plate.

The light guide plate may include a light-incident portion on which the light from the light source is incident, and the first prism pattern including an iterated curve, wherein each curve may be deflected away from the light-incident portion relative to points connecting adjacent curves.

According to an embodiment of the present invention, there is provided a liquid crystal display, which includes a liquid crystal display panel having a plurality of pixels formed therein, and a backlight assembly including a light source and a light guide plate for guiding light incident from the light source and providing the liquid crystal display panel with the light, wherein the light guide plate includes a first prism pattern disposed substantially normal to a path of light incident from the light source.

The light source may have at least one light emitting diode. The first prism pattern may include a plurality of substantially parallel prisms, wherein an interval between the prisms may be N or 1/N times of a pixel pitch of the LCD panel, where N is a natural number.

BRIEF DESCRIPTION OF THE DRAWINGS

Preferred embodiments of the present invention can be understood in more detail from the following description taken in conjunction with the accompanying drawings, in which.

DETAILED DESCRIPTION OF PREFERRED EMBODIMENTS

Figure 1:
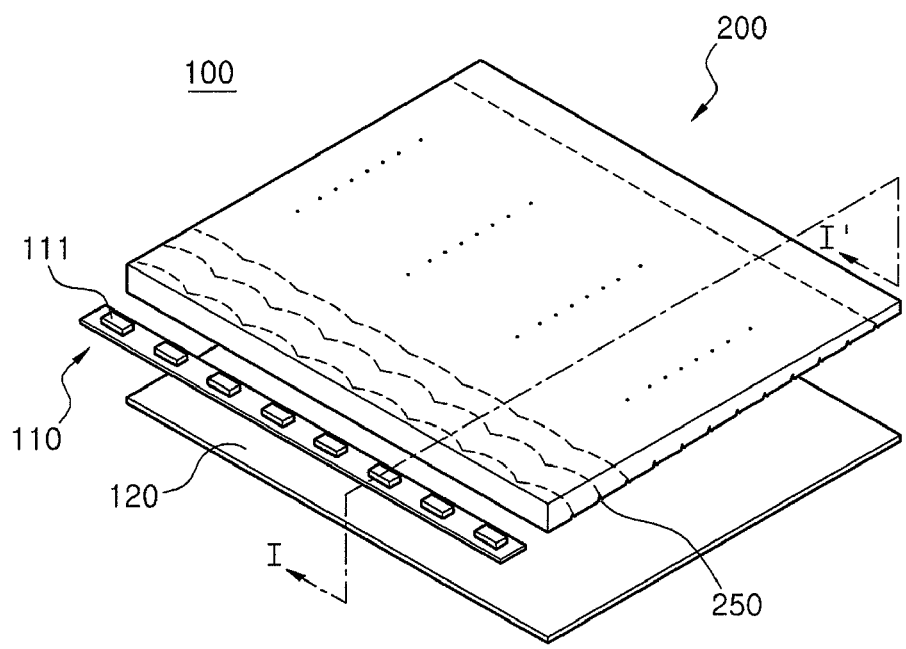
FIG. 1 is an exploded perspective view showing a backlight assembly according to an embodiment of the present invention.

Hereinafter, exemplary embodiments of the present invention will be described in detail with reference to the accompanying drawings.

However, the present invention is not limited to embodiments disclosed below but may be implemented into different forms. Embodiments are provided only for illustrative purposes and for full understanding of the scope of the present invention by those skilled in the art. Throughout the drawings, like reference numerals are used to designate like elements.

Figure 2:
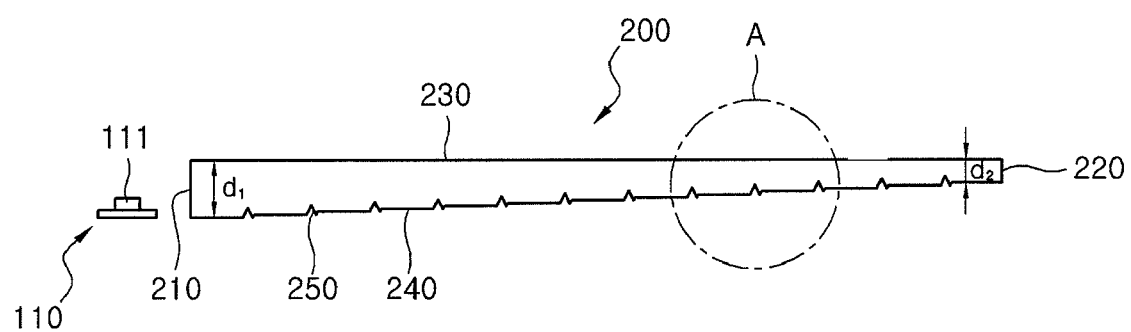
FIG. 2 is a sectional view of a light guide plate taken along line I-I' of FIG. 1.

FIG. 1 is an exploded perspective view showing a backlight assembly according to an embodiment of the present invention, and FIG. 2 is a sectional view of a light guide plate taken along line I-I' of FIG. 1. Each of the following views including FIG. 1 is a schematic view, in which the size and shape of each portion may be exaggerated for convenience of illustration.

Referring to FIGS. 1 and 2, a backlight assembly 100 according to an embodiment of the present invention includes a light source 110 for generating light, a light guide plate 200 for guiding a path of the light generated by the light source 110, and a reflective sheet 120 disposed under the light guide plate 200.

The light source 110 is disposed to a side of the light guide plate 200. The light source 110 generates light in response to electric power supplied by a power source (not shown). The light source 110 includes, for example, one or more light emitting diodes (LEDs) 111. Alternatively, the light source 110 may include a cold cathode fluorescent lamp (CCFL) which has a shape of a slim and elongated cylinder, an external electrode fluorescent lamp (EEFL) in which electrodes are formed on outsides of both ends of the EEFL, etc.

Although not shown, the backlight assembly 100 may further include a light source cover surrounding at least three surfaces of the light source 110, which may protect the light source 110. The light source cover may be made of a highly reflective material or have a structure in which an inner surface of the light source cover is coated with a high reflective material, thereby causing the light generated from the light source 110 to be reflected to the light guide plate 200, which may improve a utilization efficiency of the light.

The light guide plate 200 guides a path of the light from the light source 110. The light guide plate 200 is made of a transparent material in order to guide the light. For example, the light guide plate 200 may be made of a polymethylmethacrylate (PMMA) material. The light guide plate 200 includes a light-incident portion 210, a light-facing portion 220, a light-exiting portion 230 and a reflective portion 240. The light generated from the light source 110 is incident into the light guide plate 200 through the light-incident portion 210. The light-facing portion 220 faces the light-incident portion 210 and has a smaller thickness than the light-incident portion 210. The light-exiting portion 230 extends from an upper side of the light-incident portion 210 to be connected to an upper side of the light-facing portion 220. The light-exiting portion 230 is substantially perpendicular to the light-incident portion 210 and the light-facing portion 220. The reflective portion 240 extends from a lower side of the light-incident portion 210 to be connected to a lower side of the light-facing portion 220. Accordingly, the light guide plate 200 has a wedge shape which tapers from the light-incident portion 210 to the light-facing portion 220. The reflective portion 240 of the light guide plate 200 includes a plurality of first prism patterns 250. The first prism patterns 250 may be formed by being engraved on the reflective portion 240 toward the inside of the light guide plate 200. The first prism patterns 250 may be transferred on the reflective portion 240 by an injection molding process. Alternatively, the first prism patterns 250 may be formed on the reflective portion 240 by various processes including a stamping process.

The regions of the reflective portion 240 positioned between the first prism patterns 250 are configured to be substantially parallel with the light-exiting portion 230 so that the light guided into the light guide plate 200 may substantially satisfy a total reflection condition. That is, the regions of the reflective portion 240 positioned between the first prism patterns 250 are configured to be substantially perpendicular to the light-incident portion 210. Accordingly, the light incident into the light guide plate 200 through the light-incident portion 210 is reflected from the reflective portion 240 and the light-exiting portion 230. A reflection angle of the light is changed by the first prism patterns 250, so that the light may exit through the light-exiting portion 230 at an angle substantially perpendicular to the light-exiting portion 230.

The reflective sheet 120 may be disposed under the reflective portion 240 of the light guide plate 200. The reflective sheet 120 reflects the light leaking to the outside through the reflective portion 240 of the light guide plate 200 to be incident into the light guide plate 200 again. The reflective sheet 120 is made of a highly light-reflective material. For example, the reflective sheet 120 may be made of a white polyethylene terephthalate (PET) material or a white polycarbonate (PC) material.

Figure 3:
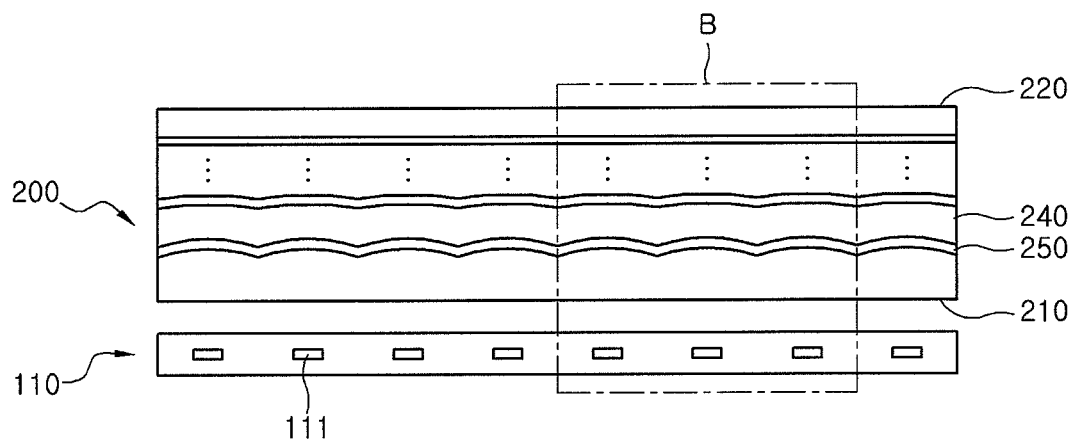
FIG. 3 is a plan view of FIG. 1.

FIG. 3 is a plan view of FIG. 1.

Referring to FIG. 3, the reflective portion 240 of the light guide plate 200 includes the plurality of first prism patterns 250, and each first prism pattern 250 has an arched shape of a curve having a predetermined curvature in plan view. More specifically, the plurality of first prism patterns 250, which are substantially parallel with each other, are disposed in parallel with the light-incident portion 210 to which the light source 110 is adjacently disposed, and a first prism pattern, which has the arched shape of the curve having the predetermined curvature, is iterated multiple times to form the plurality of first prim patterns 250. The respective curves of the first prism patterns 250 may be different from each other. Further, the curvature of the arched shape of the curve of the first prism pattern 250 may become smaller away from the light-incident portion 210.

The first prism patterns 250 may be shaped as a quadratic function curve on a plane of the light guide plate 200. In this case, as with the aforementioned arched shape, the coefficients of the independent variables in the first prism pattern 250 of the second quadratic function curve may become smaller away from the light-incident portion 210.

In either the arched shape or the quadratic function curve, the first prism pattern 250 approaches a linear shape away from the light-incident portion 210 and near to the light-facing portion 220, so that the first prism pattern 250 adjacent to the light-facing portion 220 may be substantially linear.

Figure 4:
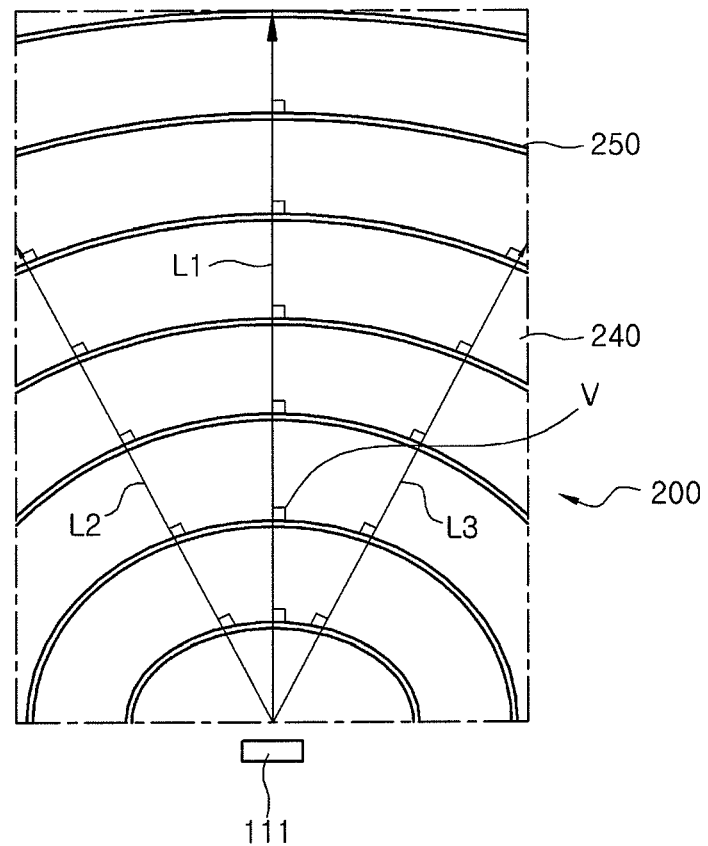
FIG. 4 is a conceptual view showing principles of the light guide plate according to an embodiment of the present invention.

FIG. 4 is a conceptual view showing a principle of a light guide plate according to an embodiment of the present invention.

Referring to FIG. 4, the first prism patterns 250 of the light guide plate 200 according to an embodiment of the present invention are formed so that the light exiting from a single point light source such as the light emitting diode 111 is incident across the first prism patterns 250, preferably perpendicularly to the first prism patterns 250 in plan view. That is, the first prism patterns 250 are formed to be curved so that light L2 and light L3, which are radially incident into the light guide plate 200 from the point light source 111, as well as light L1, which is substantially perpendicularly incident into the light guide plate 200 from the point light source 111, may be perpendicularly incident into the first prism patterns 250 in plan view. Each of the first prism patterns 250 may be formed along an isometric region on which the intensities of the lights L1, L2 and L3 radially exiting from the point light source 111 are substantially identical to each other. That is, each of the first prism patterns 250, each of which is formed in an elliptical shape, more preferably a circular shape, about the single point light source 111, may be formed to be spaced apart from each other in a radial direction of the point light source 111. Accordingly, the distances from respective points of any one of the first prism patterns 250 to the point light source 111 may be substantially identical to each other. If it is supposed that each first prism pattern 250 takes a portion of the elliptical shape, more precisely a circular shape, the point light source 111 becomes the center of the circle defined by each first prism pattern 250, so that a half of the circle defined by each first prism pattern 250, i.e., a semicircle, may be formed on the light guide plate 200. As the first prism pattern 250 of a circular shape formed on the light guide plate 200 goes away from the point light source 111, the radius of the first prism pattern 250 becomes large to be converged to a linear shape, so that the first prism pattern 250 may be a complete linear shape when it is an infinite distance from the point light source 111. In this case, since only a portion smaller than or equal to a half of the elliptical shape may be shaped, the curvature may be still maintained. As an alternative embodiment, the curvature of the elliptical shape may be progressively reduced.

Figure 5:
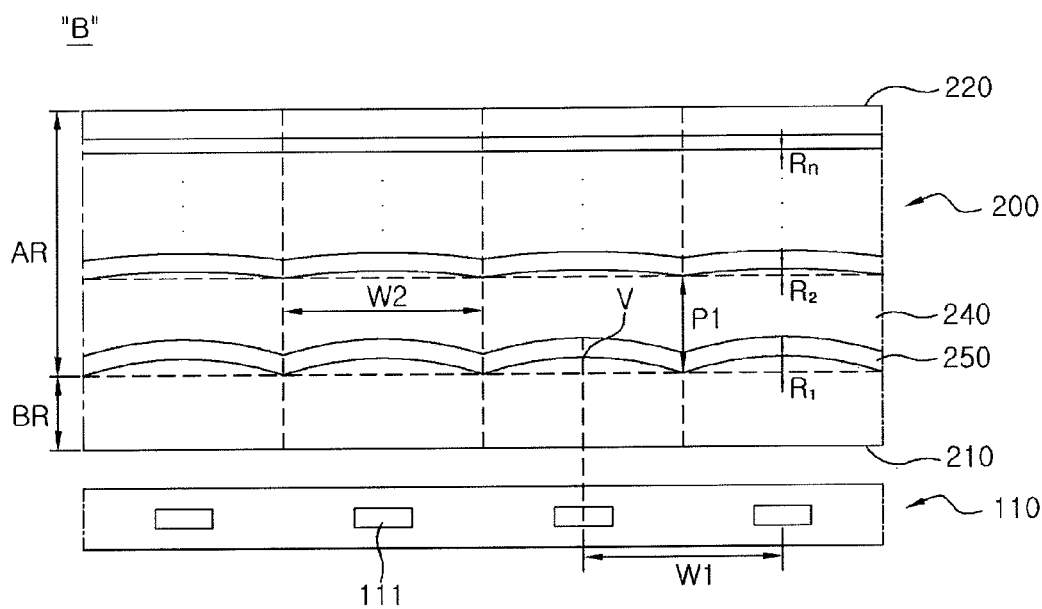
FIG. 5 is an enlarged view of portion B of FIG. 3.

FIG. 5 is an enlarged view of portion B of FIG. 3. FIG. 5 shows a view in which the single point light source 111 described with reference to FIG. 4 is generalized to be a plurality of point light sources, i.e., a plurality of light emitting diodes 111, so that the light interference between lights emitted from the respective light emitting diodes 111 is considered.

Referring to FIG. 5, the first prism patterns 250 of the light guide plate 200 have bent portions corresponding to respective ones of the plurality of light emitting diodes 111 of the light source 110. The respective first prism patterns 250 of the light guide plate 200 correspond to the light source 110 in which the plurality of light emitting diodes 111 are arranged as point light sources, wherein the bent portions may be continuously connected to each other. For example, the first prism patterns 250 may be formed in a trochoidal shape on the plane of the light guide plate 200. That is, the first prism pattern 250 may be formed in the shape of a straight line, e.g., a trajectory of a central point generated by a rotation of a circle formed at relatively far from the light emitting diode 111, as well as a cycloid, e.g., a trajectory of a circumference generated by a rotation of a circle formed relatively near the light emitting diode 111, respectively. In case of the cycloidal shape, a shape of the first prism pattern 250 may be a tautochrone. The first prism pattern 250 with such a shape may be also formed in the shape of a cosine or wavy line. More specifically, the first prism pattern 250 may be formed to have a concave curved shape with respect to the light-incident portion 210. In either case, it is preferable that the respective first prism patterns 250 which correspond to the respective light emitting diodes 111 as point light sources be disposed to be spaced apart by substantially the same distance from the respective light emitting diodes 111, and the respective first prism patterns 250 may have the shape listed above in association with their adjacent light emitting diodes 111.

The respective first prism patterns 250 are arranged substantially in parallel with the light-incident portion 210 and have the iterated curved portions in which the aforementioned shape is iterated at least one or more times. Further, the curvatures or bending degrees of the curved portions in one of the first prism patterns 250 may be substantially identical to each other, and the curvature of the curved portion in the first prism pattern 250 may become smaller away from the light-incident portion 210 to the light-facing portion 220. It is preferable that the first prism patterns 250 not be formed in a portion corresponding to a black matrix region (BR); the first prism patterns 250 are preferably formed in a portion corresponding to an active matrix region (AR) on which pixels are formed.

Further, one period W2 of the curved portions in the first prism pattern 250 may be N or 1/N times of a distance W1 between the light emitting diodes 111, where N is a natural number. Preferably, N may be 1, i.e., the period W2 of the curved portions in the first prism pattern 250 is substantially identical to the distance W1 between the light emitting diodes 111. As described above with reference to FIG. 4, the first prism patterns 250 are formed corresponding to the light emitting diodes 111, so that the light radially exiting from the light emitting diodes 111 may be incident substantially perpendicularly to the first prism patterns 250. Since only one curved portion in the first prism pattern 250 is formed for each of the light emitting diodes 111, the number of the curved portions in the first prism pattern 250 may be preferably identical to that of the light emitting diodes 111.

If the curved portion of the first prism patterns 250 is a quadratic function curved shape, the extreme points V on which the quadratic function curve is maximum or minimum may be formed corresponding to the positions of the light emitting diodes 111. The extreme points V of the first prism patterns 250 having the quadratic function curved shape may be arranged corresponding to the respective light emitting diodes 111 and be substantially parallel to the light emitting diodes 111, and the distance between the extreme points 111 may be substantially identical to that between the light emitting diodes 111.

In FIG. 5, it is supposed that a maximum deviation R of the first prism pattern 250 is defined as a farthest distance from a reference line, i.e., an imaginary line formed by connecting respective points of the first prism pattern 250 which are closest to the light-incident portion 210, to points of an incident surface of the first prism pattern farthest from the light-incident portion 210, e.g., the extreme point V, of the actually formed curved portion in the first prism pattern 250. The deviation $R_1$ of the first prism pattern 250 which is close to the light-incident portion 210 is larger than a value of the deviation of the first prism pattern 250 away from the light-incident portion 210. The relationship is satisfied as follows: $R_n > R_{n+1}$. If n approaches the infinite $\infty$, $R_n$ will converge to zero. The relationship may be satisfied as follows:

$$\lim_{n \to \infty} R_n = 0.$$

However, considering the light amount and intensity of the light source 110 used in practice, $R_n$ may converge to zero even if n does not approach the infinite $\infty$.

As the first prism pattern 250 goes away from the light-incident portion 210, i.e., gets near to the light-facing portion 220, the light intensity becomes progressively smaller, and accordingly, an interval between the first prism patterns 250, i.e., a pitch P1, may become denser.

The pitch P1 between the first prism patterns 250 which are parallel with the light-incident portion 210 may be N or 1/N times of the pixel pitch of the LCD panel, where N is a natural number. Preferably, the pitch P1 between the first prism patterns 250 is substantially identical to the pixel pitch of the LCD panel. As described above, if the pitch P1 of the first prism pattern 250 corresponds to the pixel pitch of the LCD panel, the moiré phenomenon due to the light interference can be substantially prevented.

FIG. 5 is a view showing only a portion of the light source 110 and the light guide plate 200. If the light source 110 and the light guide plate 200 are infinitely arranged in the right-and-left direction in the figure, the light guide plate 200 may have the first prism patterns 250 of the same shape as shown in FIG. 5. If there is a boundary of the light guide plate 200 and the light source 110 at the right or left side in the figure, the side having the boundary may be provided with the first prism patterns 250 which have the curves whose curvature is large as shown in FIG. 4.

Figure 6:
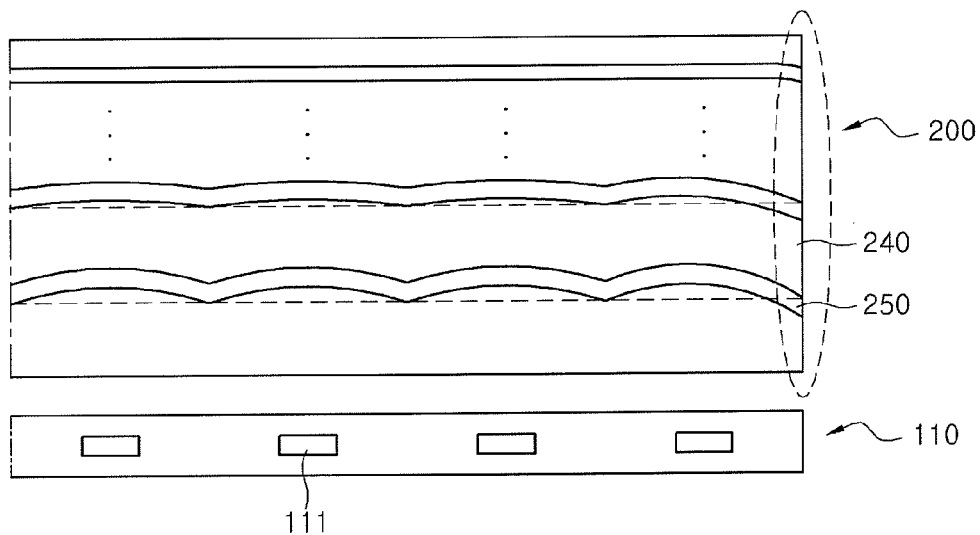
FIG. 6 is a view showing a modification of FIG. 5.

FIG. 6 is a view showing a modification of FIG. 5 accordingly to an embodiment of the present invention.

Referring to FIG. 6, in the modification, the first prism patterns 250 are partially deflected at least at one lateral side end of the light guide plate 200 toward the light-incident portion 210 as shown in the dashed region. Light radially exiting from any one of the point light sources 111 constructively interferes with light radially exiting from another one of the point light sources at a central portion of the light guide plate 200 thereby substantially maintaining the light intensity. The constructive interference does not occur relatively at ends of the light guide plate 200; the modification of the light guide plate 200 of FIG. 6 compensates for the lower constructive interference. Since the light trajectory of the equivalent intensity is deflected toward the light-incident portion 210 at the ends of the light guide plate 200 as compared with the central portion of the light guide plate 200, there exists a region in which the intensity of the light is relatively decreased; the first prism patterns 250 are configured to be deflected toward the light-incident portion 210 at both the ends of the light guide plate 200. The partial deflection of the first prism pattern 250 may become weaker away from the light-incident portion 210, and the first prism pattern 250 close to the light-facing portion 220 may be substantially linear.

Figure 7:
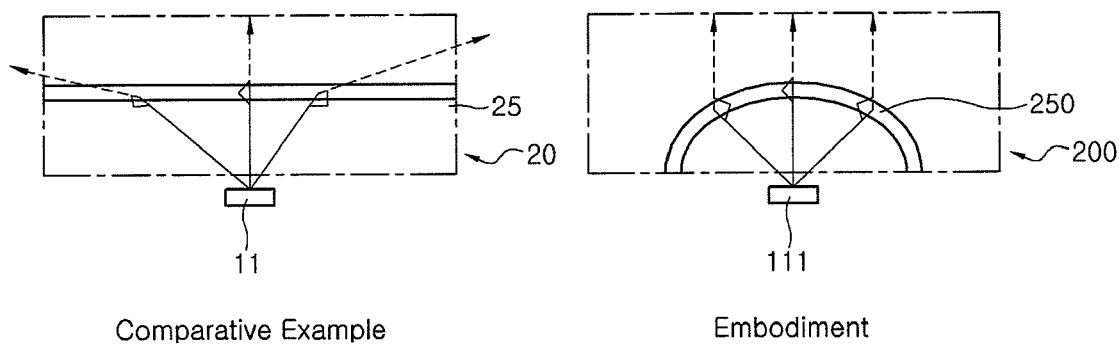
FIG. 7 is a view schematically showing light exiting characteristics of an incident light according to an embodiment of the present invention and a comparative example.

FIG. 7 is a view schematically showing light exiting characteristics of an incident light in a device according to an embodiment of the present invention and a comparative example. Although only one of the point light sources is employed in the device according to an embodiment of the present invention and the comparative example shown in FIG. 7 for convenience of comparison, the operation will not be changed even by employing a plurality of light sources or a linear light source.

As shown in FIG. 7, in a light guide plate 20 having a conventional linear first prism pattern 25, the light incident from a singe point light source 11 toward the light guide plate 20 and reflected from the first prism pattern 25 exits depending on the incident angle of the light. Accordingly, the light incident on the light guide plate 20 with a relatively large incident angle may exit in a direction in which the light propagates beyond the surface area of the light guide plate 20 toward a light-exiting portion thereof, i.e., in an outside direction of the light guide plate.

Since the light exiting from the point light source 111 is perpendicularly incident into the first prism pattern 250 of the light guide plate 200, the light reflected by the first prism pattern 250 and exiting therefrom does not propagate beyond the surface area of the light guide plate 200 toward the light-exiting portion thereof. The light exiting toward the side can be collected toward the light-exiting portion and within the surface area of the light guide plate 200. Accordingly, as compared with the conventional example, a device according to an embodiment of the present invention secures a larger amount of the light exiting through the surface area of the light guide plate 200 to improve the brightness and the uniformity of light. Further, even if light is incident in any direction through the whole region in the surface area of the light guide plate 200, the light may exit within the surface area of the light guide plate 200, i.e., toward the front surface of the light-exiting portion 230, so that phenomenon such as white spots or white lines can be substantially prevented.

Figure 8:
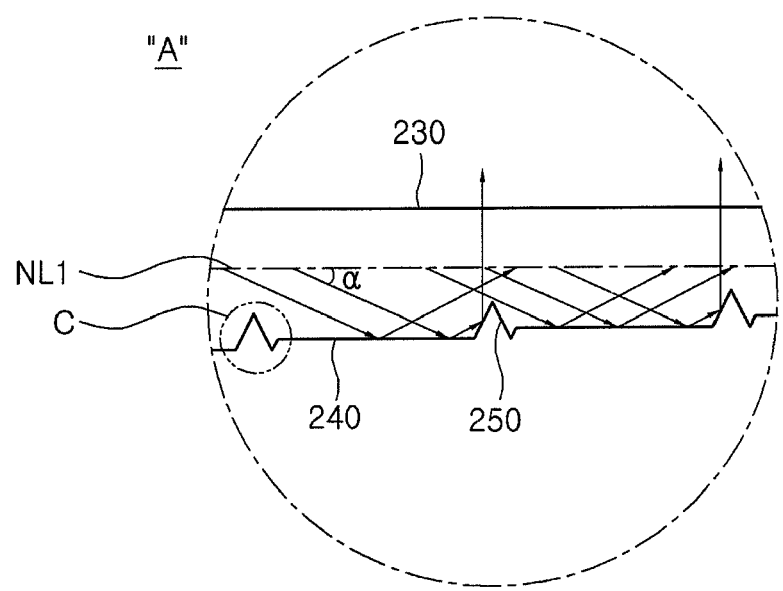
FIG. 8 is an enlarged view of portion A of FIG. 2.

FIG. 8 is an enlarged view of portion A of FIG. 2 enlarged.

Referring to FIGS. 2 and 8, the reflective portion 240 of the light guide plate 200 is provided with the first prism patterns 250 which are arranged at a predetermined interval, and the regions of the reflective portion 240 positioned between the first prism patterns 250 are formed substantially in parallel with the light-exiting portion 230.

The light incident into the light guide plate 200 from the light source 110 through the light-incident portion 210 propagates inside of the light guide plate 200 within a range without departing from a specific critical angle α with respect to the normal line NL1 of the light-incident portion 210. When the light incident into the light-incident portion 210 propagates inside of the light guide plate 200, the critical angle a represents the maximum angle which can be formed with respect to the normal line NL1 of the light-incident portion 210.

The critical angle α can be obtained from Equation 1 which shows the Snell's law as follows:

$$n_1 \times \sin\theta_1 = n_2 \times \sin\theta_2 \quad \text{Equation 1}$$

where $n_1$ is a refractive index of a first medium, $n_2$ is a refractive index of a second medium. Further, $\theta_1$ is an angle between the normal line of the incident surface and the propagation direction of the light in the first medium, while $\theta_2$ is an angle between the normal line of the incident surface and the propagation direction of the light in the second medium.

If it is supposed that the second medium is denser than the first medium, the refractive index $n_2$ of the second medium is larger than the refractive index $n_1$ of the first medium, and therefore, $\theta_2$ should be smaller than $\theta_1$ in order to satisfy Equation 1. Accordingly, if the light propagates from the first medium which is the thinner medium to the second medium which is the denser medium, $\theta_2$ should be increased as $\theta_1$ is increased, and $\theta_2$ is the critical angle α when $\theta_1$ is 90°.

From Equation 1, the critical angle α may be represented by Equation 2 as follows:

$$\alpha = \sin^{-1}(n_1/n_2) \quad \text{Equation 2}$$

Accordingly, the critical angle α is determined by the refractive indexes of the first medium and the second medium. According to an embodiment of the present invention, the first medium is air which exists between the light source 110 and the light guide plate 200 while the second medium is the light guide plate 200. The refractive index of air is about 1. If the light guide plate 200 is made of, for example, polymethylmethacrylate (PMMA), the refractive index of the second medium is about 1.49. Accordingly, in case of the PMMA light guide plate 200, the critical angle α may become about 42.16°.

Meanwhile, the light reaching the light-incident portion 210 of the light guide plate 200 from the light source 110 propagates into the light guide plate 200 within a range of the critical angle α. The light incident into the light guide plate 200 reaches the reflective portion 240 or the light-exiting portion 230. A portion of the light, which reaches the reflective portion 240 or the light-exiting portion 230 and substantially satisfies the total reflection condition of the light guide plate 200, is reflected toward the inside of the light guide plate 200 again, but the other portion of the light, which does not substantially satisfy the total reflection condition, exits to the outside of the light guide plate 200. A portion of the light, which reaches the reflective portion 240 or the light-exiting portion 230 at an angle larger than the critical angel a with respect to the normal line of the light-exiting portion 230, is reflected toward the inside of the light guide plate 200 again, but the other portion of the light, which reaches the reflective portion 240 or the light-exiting portion 230 at an angle smaller than the critical angle α, exits to the outside of the light guide plate 200.

Since the regions of the reflective portion 240 positioned between the first prism patterns 250 are formed substantially in parallel with the light-exiting portion 230, the light which reaches the reflective portion 240 or the light-exiting portion 230 at an angle smaller than or equal to the critical angle α with respect to the normal line NL1 of the light-incident portion 210 is reflected. A portion of the light which reaches the reflective portion 240 changes its propagation angle by the first prism patterns 250, so that a portion of the light, which reaches the light-exiting portion 230 at an angle smaller than or equal to the critical angle α with respect to the normal line of the light-exiting portion 230, may exit to the outside. Accordingly, the light incident into the light guide plate 200 through the light-incident portion 210 is reflected from the regions of the reflective portion 240 positioned between the first prism patterns 250, or changes its reflection angle by the first prism patterns 250 to exit through the light-exiting portion 230.

Since the regions of the reflective portion 240 positioned between the first prism patterns 250 are formed substantially in parallel with the light-exiting portion 230, in a case where the light guide plate 200 has a wedge shape which tapers from the light-incident portion 210 toward the light-facing portion 220, the reflective portion 240 may be designed so that the gap between the reflective portion 240 and the light-exiting portion 230 is decreased with the first prism patterns 250 as the boundaries therebetween as the reflective portion 240 goes from the light incident portion 210 to the light facing portion 220. The reflective portion 240 substantially parallel with the light-exiting portion 230 may be formed in the shape of steps, which becomes nearer to the light-exiting portion 230 away from the light-incident portion 210 to the light-facing portion 220.

Figure 9:
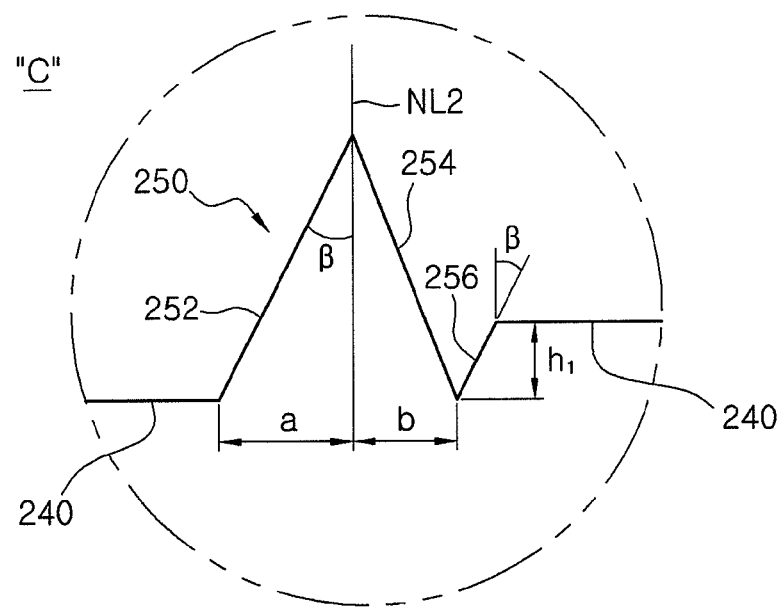
FIG. 9 is an enlarged view of portion C of FIG. 8.

FIG. 9 is an enlarged view of portion C of FIG. 8 enlarged.

Referring to FIG. 9, the first prism pattern 250 formed on the reflective portion 240 of the light guide plate 200 includes a groove whose the cross section is substantially triangular in order to allow the light propagating in the light guide plate 200 to exit toward the light-exiting portion 230.

The first prism pattern 250 includes a first inclined surface 252, a second inclined surface 254 connected to the first inclined surface 252, and a third inclined surface 256 connected to the second inclined surface 254. The first inclined surface 252 is formed to be inclined from the reflective portion 240 toward the light-exiting portion 230. The second inclined surface 254 is formed to be inclined from the upper end of the first inclined surface 252 toward the reflective portion 240. The third inclined surface 256 is formed to extend substantially in parallel with the first inclined surface 252 from the lower end of the second inclined surface 254 and then to be connected to the reflective portion 240.

The first inclined surface 252 and the second inclined surface 254 are substantially asymmetric to each other with respect to the normal line NL2 of the light-exiting portion 230. Specifically, a first lower side a of the first inclined surface 252 is larger than a second lower side b of the second inclined surface 254. In order to increase the brightness, a ratio of the first lower side a to the second lower side b may be about 4:3.

The light guide plate 200 has a first thickness d1 at the light-incident portion 210 and a second thickness d2 at the light-facing portion 220, which is smaller than the first thickness d1, and the regions of the reflective portion 240 positioned between the first prism patterns 250 are configured substantially in parallel with the light-exiting portion 230. Accordingly, there is a thickness difference between the adjacent two steps with respect to the first prism pattern 250.

A first height h1 of the third inclined surface 256 corresponding to the thickness difference between the adjacent two steps of the first prism pattern 250 may be obtained by Equation 3 as follows:

$$(d1-d2)/m \qquad \text{Equation 3}$$

where d1 is the first thickness of the light-incident portion 210, d2 is the second thickness of the light-facing portion 220, and m is the number of the steps in the reflective portion 240.

That is, the first height h1 of the third inclined surface 256 is determined depending on the thickness difference between the light-incident portion 210 and the light-facing portion 220 and the number of the steps in the reflective portion 240.

The PMMA light guide plate has the critical angle $\alpha$ of about 42.16°. For example, if the length of the PMMA light guide plate from the light-incident portion 210 to the light-facing portion 220 is about 213 mm and the pitch between the first prism patterns 250 is about 300 µm, the number of the steps in the reflective portion 240 is 710. If the first thickness d1 of the light-incident portion 210 of the PMMA light guide plate is about 2.6 mm and the second thickness d2 of the light-facing portion 220 thereof is about 0.7 mm, the thickness difference is 1.9 mm. According to Equation 3, the first height h1 of the third inclined surface 256 is about 2.68 µm. A distribution of an exiting angle of the light exiting through the light-exiting portion 230 of the light guide plate 200 is influenced by the internal angle between the first inclined surface 252 and the second inclined surface 254. Since the first lower side a of the first inclined surface 252 and the second lower side b of the second inclined surface 254 are different from each other, the internal angle $\beta$ between the first inclined surface 252 and the normal line NL2 of the light-exiting portion 230 and the internal angle between the second inclined surface 254 and the normal line NL2 of the light-exiting portion 230 are different from each other.

In order to increase a distribution of the light vertically exiting, the internal angle $\beta$ between the first inclined surface 252 and the normal line NL2 of the light-exiting portion 230 ranges from about 34° to 44°. Preferably, the internal angle $\beta$ between the first inclined surface 252 and the normal line NL2 of the light-exiting portion 230 is about 39°.

Figure 10:
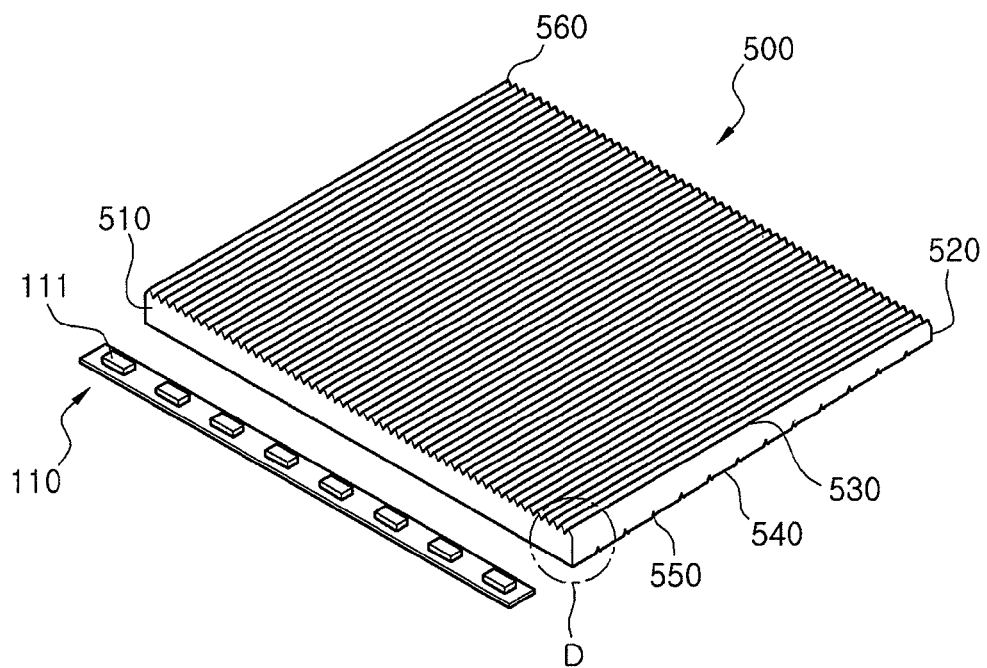
FIG. 10 is a perspective view showing a light guide plate according to an embodiment of the present invention.
Figure 11:
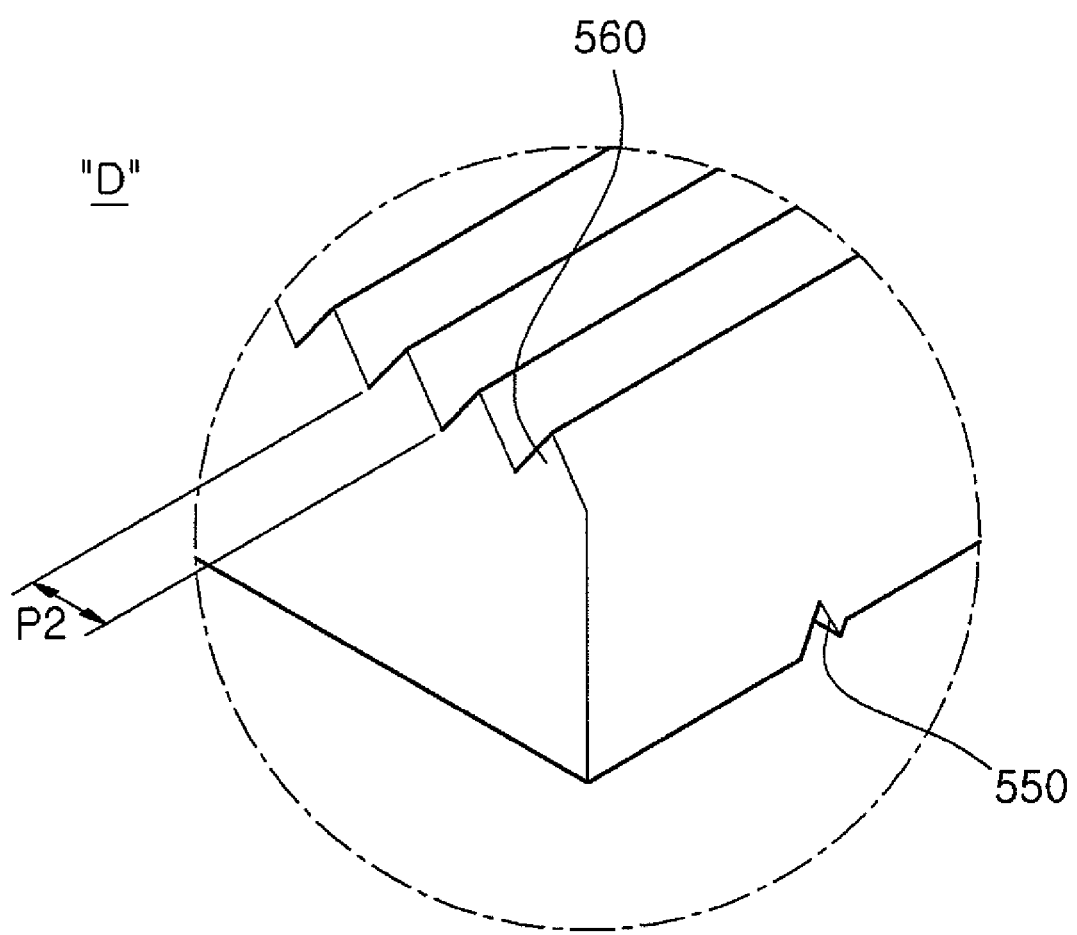
FIG. 11 is an enlarged view of portion D of FIG. 10.

FIG. 10 is a perspective view showing a light guide plate according to an embodiment of the present invention, and FIG. 11 is an enlarged view of portion D of FIG. 10 enlarged.

Referring to FIGS. 10 and 11, a light guide plate 500 according to an embodiment of the present invention includes a light-incident portion 510 on which light generated from the light source 110 is incident; a light-facing portion 520, which faces the light-incident portion 510 and has a smaller thickness than the light-incident portion 510; a light-exiting portion 530 extending substantially vertical from an upper side of the light-incident portion 510 to be connected to an upper side of the light-facing portion 520; and a reflective portion 540 extending from a lower side of the light-incident portion 510 to be connected to a lower side of the light-facing portion 520. Accordingly, the light guide plate 500 has a wedge shape which tapers from the light-incident portion 510 to the light-facing portion 520.

The reflective portion 540 of the light guide plate 500 includes a plurality of first prism patterns 550 in the shape of strips which are formed substantially in parallel with the light-incident portion 510. Further, regions of the reflecting portion 540 positioned between the first prism patterns 550 are formed substantially in parallel with the light-exiting portion 530 so that the light guided into the light guide plate 500 may substantially satisfy the total reflection condition.

Accordingly, the light incident into the light guide plate 500 through the light-incident portion 510 is reflected from the reflecting portion 540 light-exiting portion, and the reflection angle of the light is changed by the first prism pattern 550 thereby exiting through the light-exiting portion 530. Since the first prism patterns 550 are substantially the same as described above, the overlapping description thereof will be omitted.

The light-exiting portion 530 of the light guide plate 500 includes a plurality of second prism patterns 560 which are connected to each other. The second prism patterns 560 are formed throughout the whole surface of the light-exiting portion 530 and collect the propagation direction of the light exiting through the light-exiting portion 530 to the front direction to thereby increase the front-directional brightness. The second prism patterns 560 are formed in a substantially perpendicular direction to a longitudinal direction of the light source 110, i.e., in a direction substantially normal to the light-incident portion 510. Accordingly, the first prism patterns 550 and the second prism patterns 560 are formed to cross with each other. The cross section of each second prism pattern 560 substantially perpendicular to its longitudinal direction has a substantially triangular shape. A vertical angle $\theta$ of the cross section of each second prism pattern 560 ranges from about 90° to 130°. Preferably, the vertical angle $\theta$ thereof is about 110°. A pitch p2 between the second prism patterns 560 ranges from about 50 µm to 150 µm.

The upper end of the second prism patterns 560, i.e., the edge portion at which two inclined surfaces meet each other, may be round. Alternatively, the cross section of each second prism pattern 560 substantially perpendicular to its longitudinal direction may have a substantially semi-elliptical or semi-circular shape.

Figure 12:
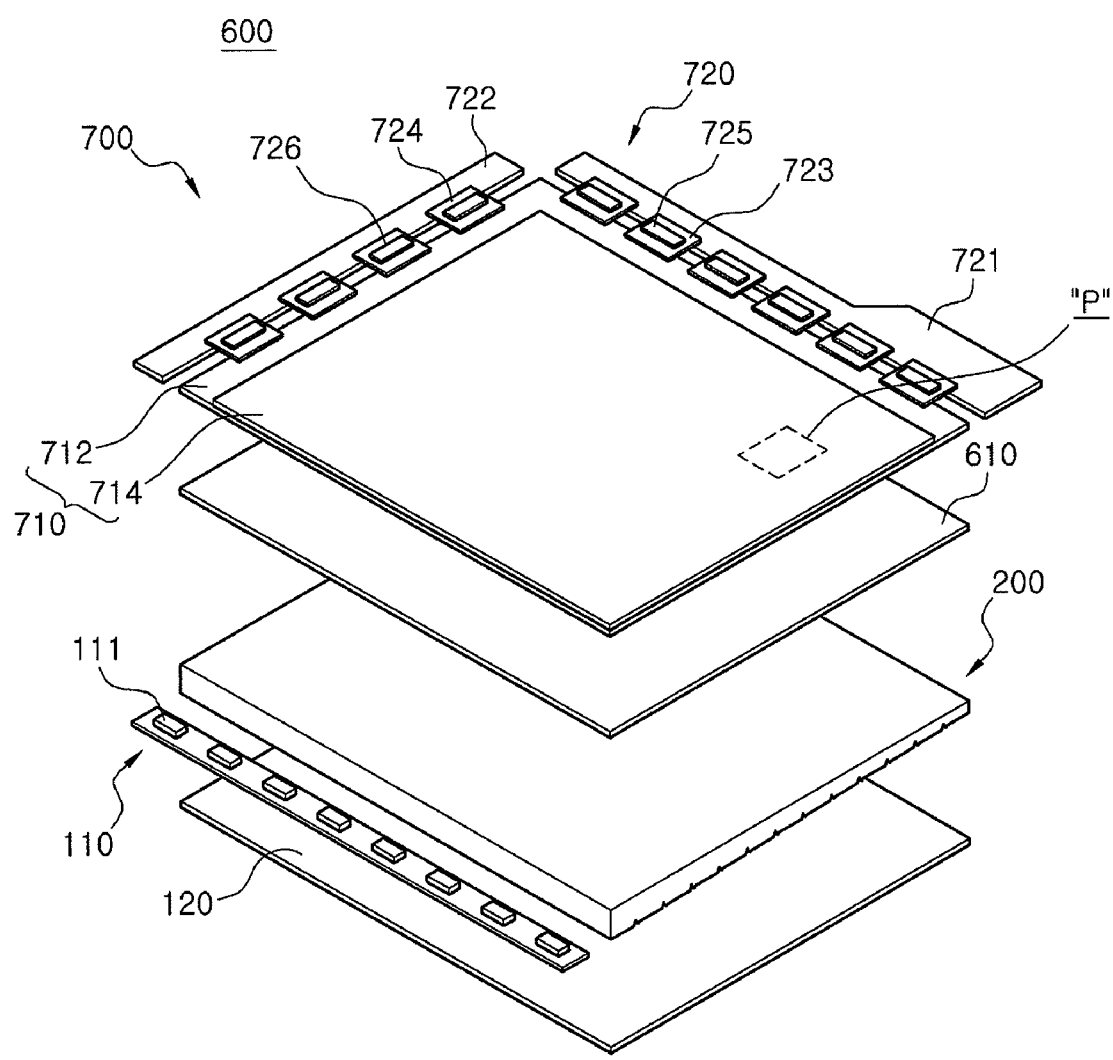
FIG. 12 is an exploded perspective view showing a liquid crystal display according to an embodiment of the present invention.
Figure 13:
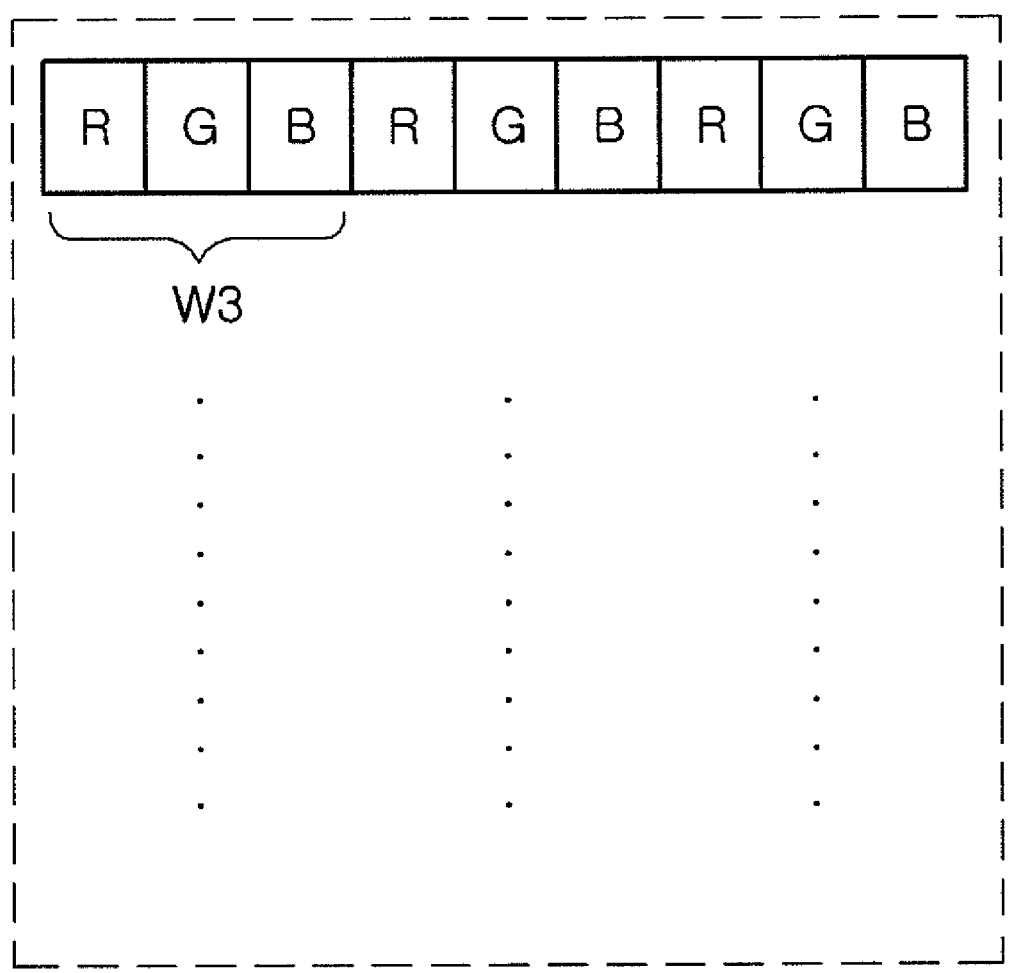
FIG. 13 is an enlarged view of portion P of FIG. 12.

FIG. 12 is an exploded perspective view showing a liquid crystal display according to an embodiment of the present invention, and FIG. 13 is an enlarged view of portion P of FIG. 12 enlarged.

Referring to FIG. 12, a liquid crystal display 600 according to an embodiment of the present invention includes a backlight assembly 100 for providing light, and a display unit 700 for displaying an image using the light provided from the backlight assembly 100.

The backlight assembly 100 includes a light source 110 for generating light, a light guide plate 200 for guiding a path of the light generated by the light source 110, and a reflective sheet 120 disposed under the light guide plate 200. The backlight assembly 100 may have any configuration described herein. Accordingly, the overlapping descriptions thereof will be omitted.

The display unit 700 includes an LCD panel 710 for displaying an image using the light provided from the backlight assembly 100 and a drive circuit 720 for driving the LCD panel 710.

The LCD panel 710 includes a first substrate 712, a second substrate 714 oppositely coupled with the first substrate 712, and a liquid crystal layer (not shown) interposed between the first and second substrates 712 and 714.

The first substrate 712 is a thin film transistor (TFT) substrate in which TFTs functioning as switching devices are formed in a matrix form. For example, the first substrate 712 is made of a transparent glass material for transmission of light. Source and gate terminals of the TFTs are connected to data and gate lines, respectively, and drain terminals of the TFTs are connected to pixel electrodes which are made of a transparent conductive material.

The second substrate 714 is a color filter substrate in which RGB pixels for implementing colors are formed in the shape of a thin film. The second substrate 714 is made of, for example, a transparent glass material. The second substrate 714 includes a common electrode which is made of a transparent conductive material.

Referring to FIG. 13 in which a portion of the second substrate 714 is enlarged, the RGB pixels are subsequently arranged in a line and have a period in a right-and-left direction and an up-and-down direction. The length of the RGB unit pixel is referred to as a pixel pitch W3. The pixel pitch may be a length in a vertical direction in the figure, i.e., a length of the single R, G or B pixel in a vertical direction. The pitch P1 (see FIG. 5) between the first prism patterns 250 (see FIG. 5) in the light guide plate 200 may be N or 1/N times of the pixel pitch W3 of the LCD panel, where N is a natural number. Preferably, the pitch P1 between the first prism patterns 250 is substantially identical to the pixel pitch of the LCD panel. As described above, if the pitch P1 between the first prism patterns 250 corresponds to the pixel pitch of the LCD panel, the moiré phenomenon caused by the light interference can be substantially prevented. Although only the stripe-shaped RGB pixels are shown in FIG. 13, other RGB arrangements such as a mosaic or delta arrangement will also be applicable.

If the gate terminal of the TFT in the LCD panel 710 as configured above is supplied with power to turn on the TFT, an electric field is formed between the pixel electrode and the common electrode. Such an electric field causes an arrangement of the liquid crystal molecules in the liquid crystal layer interposed between the first and second substrates 712 and 714 to be changed, so that the transmittance of the light provided from the backlight assembly 100 may be changed depending on the change of the arrangement of the liquid crystal molecules, thereby displaying an image.

The drive circuit 720 includes a data printed circuit board (PCB) 721 for supplying the LCD panel 710 with a data drive signal; a gate PCB 722 for supplying the LCD panel 710 with a gate drive signal; a data drive circuit film 723 for connecting the data PCB 721 to the LCD panel 710; and a gate drive circuit film 724 for connecting the gate PCB 722 to the LCD panel 710.

The data drive circuit film 723 and the gate drive circuit film 724 include data drive chips 725 and gate drive chips 726, respectively. The data and gate drive circuit films 723 and 724 include, for example, a tape carrier package (TCP) or a chip on film (COF). The gate PCB 722 may be removed by forming additional signal wires in the LCD panel 710 and the gate drive circuit film 724.

The liquid crystal display 600 may further include at least one optical sheet 610 which is disposed between the backlight assembly 100 and the LCD panel 710.

The optical sheet 610 improves a brightness characteristic of the light exiting from the light guide plate 200. The optical sheet 610 may include a diffusion sheet for diffusing the light exiting from the light guide plate 200 to improve the brightness uniformity. Further, the optical sheet 610 may include a prism sheet for collecting the light exiting from the light guide plate 200 to the front direction to improve the front brightness of the light. Further, the optical sheet 610 may include a reflective polarization sheet for increasing the brightness of the light in such a manner that a portion of the light satisfying specific conditions is transmitted while the other portion of the light is reflected. As described above, various functional optical sheets may be added to or removed from the liquid crystal display 600 depending on the brightness characteristics of an implementation.

According to embodiments of the present invention, it is possible to reduce a loss of laterally exiting light and to secure a larger amount of the light exiting through the surface area of the light guide plate to the light-exiting portion, i.e., to the front surface of the light-exiting portion, so that the brightness and the brightness uniformity can be improved. Further, even if light is incident in any direction through the whole region on the surface area of the light guide plate, the light can exit through the surface area of the light guide plate. Thus, the phenomenon such as the white spots or the white lines can be prevented.

Moreover, embodiments of the present invention may substantially prevent the moiré phenomenon caused by the light interference.

Furthermore, embodiments of the present invention can provide a liquid crystal display whose display quality and operation efficiency are improved.

Although the present invention has been illustrated and described in connection with the accompanying drawings and preferred embodiments, it will be understood by those skilled in the art that various modifications and changes can be made thereto without departing from the technical spirit of the invention defined by the appended claims.

What is claimed is:

1. A light guide plate comprising:
a light-incident portion allowing light generated from a point light source to be incident thereon;
a light-facing portion opposite to the light-incident portion; and
a first prism pattern disposed between the light-incident portion and the light-facing portion and formed to have a curved portion having a deviation in a distance away from the light-incident portion so that the first prism pattern is substantially perpendicular to a path of an incident light from the point light in top view at a central portion of the light guide plate, wherein the first prism pattern is partially deflected at an end portion of the light guide plate so that the first prism pattern is oblique to the path of the incident light from the point light in top view at the end portion of the light guide plate, the end portion of the light guide plate being perpendicular to the light-incident and light-facing portions.

2. The light guide plate as claimed in claim 1, wherein the first prism pattern comprises portions having at least one of a trochoidal shape including a cycloidal or tautochrone shape, a cosine shape, a wavy line shape, an elliptical shape, a circular shape, an arched shape, a plane-geometrical quadratic function curved shape and a curved concave shape with respect to the light-incident portion in plan view.

3. The light guide plate as claimed in claim 1, wherein the first prism pattern comprises portions having one of an elliptical shape and a circular shape.

4. The light guide plate as claimed in claim 1, wherein the first prism pattern comprises portions having a circular shape, and the point light source is positioned substantially at a center of the circular shape.

5. The light guide plate as claimed in claim 1, wherein the first prism pattern is formed substantially in parallel with the light-incident portion.

6. The light guide plate as claimed in claim 1, wherein the first prism pattern is disposed substantially in parallel with the light-incident portion and comprises substantially parallel prisms, each prism comprising an iterated curve, and a curvature of the curves of the prisms becomes smaller away from the light-incident portion.

7. The light guide plate as claimed in claim 1, further comprising a light-exiting portion extending from an upper side of the light-incident portion and connected to an upper side of the light-facing portion, wherein the light-exiting portion comprises a plurality of second prism patterns connected to each other.

8. The light guide plate as claimed in claim 7, wherein the second prism patterns are disposed substantially normal to the light-incident portion.

9. The light guide plate as claimed in claim 1, further comprising a reflective portion extending from a lower side of the light-incident portion and connected to a lower side of the light-facing portion, wherein the first prism pattern is engraved on the reflective portion.

10. The light guide plate as claimed in claim 1, wherein the first prism pattern is disposed substantially in parallel with the light-incident portion and comprises substantially parallel prisms, wherein an interval between the prisms becomes denser away from the light-incident portion.

11. The light guide plate as claimed in claim 1, wherein the light-facing portion is thinner than the light-incident portion.

12. The light guide plate as claimed in claim 11, wherein the first prism pattern is disposed substantially in parallel with the light-incident portion and comprises substantially parallel prisms, the light guide plate further comprising:
   a light-exiting portion extending from an upper side of the light-incident portion and connected to an upper side of the light-facing portion; and
   a reflective portion extending from a lower side of the light-incident portion and connected to a lower side of the light-facing portion, the reflective portion being substantially parallel to the light-exiting portion,
   wherein a gap between the reflective portion and the light-exiting portion becomes smaller with respective ones of the prisms as boundaries therebetween as the reflective portion goes from the light-incident portion to the light-facing portion.

13. The light guide plate as claimed in claim 1, wherein the first prism pattern comprises substantially parallel prisms, wherein the partial deflection becomes smaller in the prisms away from the light-incident portion.

14. The light guide plate as claimed in claim 1, wherein the first prism pattern comprises a plurality of iterations of the curved portion, each curved portion having a width centered at a respective point light source.

* * * * *